(12) United States Patent
Hole et al.

(10) Patent No.: US 7,121,768 B2
(45) Date of Patent: Oct. 17, 2006

(54) CUTTING HEAD FOR MACHINE TOOL

(75) Inventors: Trude Hole, Oslo (NO); Per Björvik, Trondheim (NO); Pål Sollie, Trondheim (NO); Knut S. Stokland, Trondheim (NO)

(73) Assignee: Teeness ASA, Trondheim (NO)

( * ) Notice: Subject to any disclaimer, the term of this patent is extended or adjusted under 35 U.S.C. 154(b) by 301 days.

(21) Appl. No.: 10/466,885

(22) PCT Filed: Jan. 15, 2002

(86) PCT No.: PCT/NO02/00020

§ 371 (c)(1),
(2), (4) Date: Jan. 22, 2004

(87) PCT Pub. No.: WO02/058869

PCT Pub. Date: Aug. 1, 2002

(65) Prior Publication Data

US 2004/0161312 A1 Aug. 19, 2004

(30) Foreign Application Priority Data

Jan. 23, 2001 (NL) .......................... 20010380

(51) Int. Cl.
B23B 29/02 (2006.01)

(52) U.S. Cl. ............................. 407/11; 407/101; 82/158

(58) Field of Classification Search .................. 407/11, 407/101, 102, 107; 82/158; 408/231, 233, 408/239 R, 239 A See application file for complete search history.

(56) References Cited

U.S. PATENT DOCUMENTS 3,296,897 A  *  1/1967   Ignatius ...................... 408/181
3,697,187 A  *  10/1972  Faber et al. ................. 408/154
3,856,428 A  *  12/1974  Eversole ..................... 408/240
4,190,388 A  *  2/1980   Mullane et al. ............. 408/188
5,330,297 A     7/1994   Engstrand
5,388,487 A  *  2/1995   Danielsen ..................... 82/158
5,809,854 A  *  9/1998   Thielen et al. ................ 82/153
6,050,751 A  *  4/2000   Hellstrom .................... 407/104
6,076,999 A     6/2000   Hedberg et al.
6,126,365 A  *  10/2000  Okawa et al. ................. 407/66
6,312,199 B1 *  11/2001  Sjoden et al. .................. 407/11
6,471,448 B1 *  10/2002  Lagerberg ...................... 407/2
2003/0206777 A1 * 11/2003 Gyllengahm ................ 407/102

FOREIGN PATENT DOCUMENTS

EP  342 692      11/1989
EP  947 267      10/1999
SE  514 938       5/2001
WO  99/39852      8/1999
WO  01/64377      9/2001

* cited by examiner

*Primary Examiner*—Daniel W. Howell
*Assistant Examiner*—Sara Addisu
(74) *Attorney, Agent, or Firm*—Wenderoth, Lind & Ponack, L.L.P.

(57) ABSTRACT

The invention concerns a cutting head (13) to be secured in an adapter (9) in a machine tool for chip removing machining. The cutting head (13) comprises a flange with a first side creating a coupling surface (4) adapted for being secured to the adapter (9). On the opposite of the flange, it is situated an other side creating at least one surface (1A) with an outwards extending protrusion (8), with securing means adapted for securing a cutting insert (5) with at least one cutting edge. The weight of the cutting head (13) is reduced as compared to the strength of the cutting head (13), and the natural frequency of the cutting head (13) is thereby increased when this is secured to the adapter (9).

5 Claims, 2 Drawing Sheets

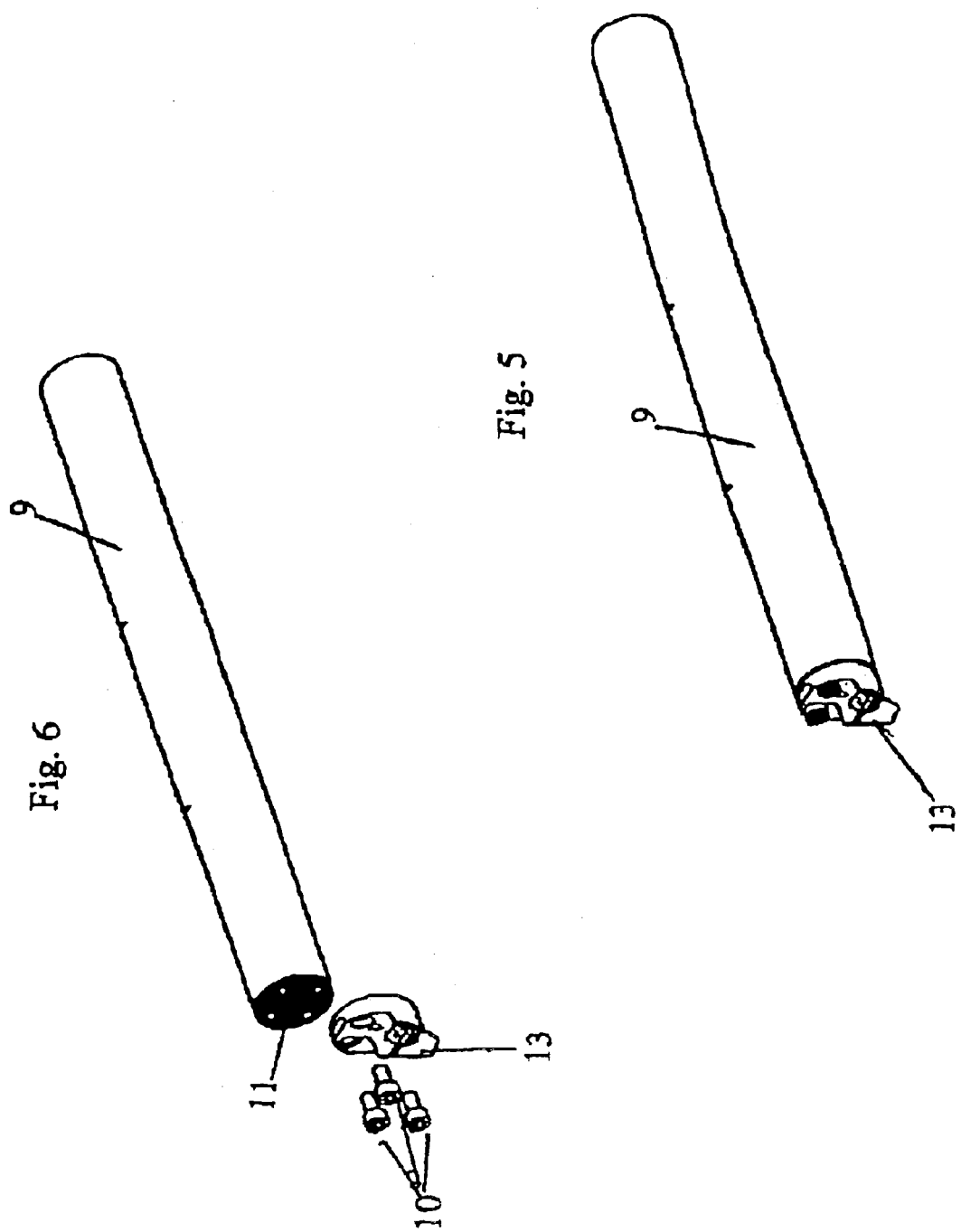

CUTTING HEAD FOR MACHINE TOOL

The present invention concerns cutting heads intended for boring bars and similar tool holders used in machine tools. These are used for internal turning. Especially, the invention concerns a particularly light cutting head giving an adapter higher natural frequency such that the adapter can be longer than what is common today.

During internal turning, it easily occur vibrations, blocking, due to the lowest natural frequency being in the same area as the naturally occurring oscillations in the shear forces or cutting forces where the process takes place. It creates poor quality of the machined surfaces, noise and poor accuracy on the work piece. It has been developed technology damping such vibrations, such that it can be machined with tool lengths up to 14 times the diameter of the boring bar.

Examples of vibration damping systems for boring bars are shown in U.S. Pat. No. 5,558,477 where it is used an active negative capacitance shunt circuit with a piezo electric reaction mass actuator. The patent describes a complicated system based on electrical circuits for the damping of the vibration from the boring bar.

EP-0 342 692 shows a cutting tool, but does not describe how vibrations can be dampend or how the boring bars length can be increased.

WO 94/04300 shows a tool holder unit where how cooling fluid flows out of the tool holder is specified.

None of the shown publications solves the problems with vibrations when using long boring bars or rods in a simple way. Accordingly there it is need for an economical and simple way to expand the area for vibration free machining such that longer boring bars can be used.

This is achieved with the present invention according to claim 1.

The invention concerns a cutting head that has been optimised in terms of the relationship between weight and strength. Reducing the weight of a cutting head with 50% can increase the natural frequency of the system to such an extent that the length of the machined hole can be increased with a half to one times the diameter of the adapter. The fact that the cutting head has a high dynamic rigidity does hence result in the toot coming further into the work piece without the creation of harmful vibrations.

The invention provides a cutting head that is designed to be secured in an adapter or a boring bar. The cutting head bears against the adapter in a coupling surface. The coupling surface is designed with means for orientation, such as serrations, guide pins or gussets. The cutting head has a flange part adapted for being secured or fastened to the adapter. The fastening can be provided by screws or bolts screwed through the flange and into the adapter, be magnetic, have a bayonet joint, be clamped with clamps, or in any way secured to the adapter. The adapter and the cutting head can alternatively be designed in one piece.

The adapter will normally have a circular cross section and the cutting head will have a substantially circular cross section corresponding to the adapter.

Preferably the cutting head and the adapter are in two parts, and the cutting head and the adapter defines an interface or a coupling surface substantially perpendicular to the longitudinal axis of the adapter. This coupling surface will normally be circular. Secured to the adapter is a cutting unit, preferably with a replaceable cutting insert or turning tool of common type. The cutting unit can for instance include a chip breaker, a replaceable cutting insert, a base screw and a base. The cutting insert can be screwed to the cutting head, or be secured with a clamping device and a clamping screw. Alternatively, the cutting insert can be an integrated part of the cutting head or in any other way be secured to the cutting head.

The cutting insert is secured to a protrusion being an integrated part of the cutting head.

The cutting head comprises a substantially circular flange part defined by the coupling surface and a free surface on the opposite side of the flange, turning away from the coupling surface. The coupling surface defines a first plane and the free surface defines a second plane. The first and the second plane defines an angle such that these planes are not parallel. The free surface may have various sections creating new planes that will create angles with the first plane as well.

A protrusion extends from the free surface or surfaces of the flange. This protrusion carries the previously mentioned cutting unit. The protrusion and the flange is one integrated piece.

The transition between the flange with those of the inclined surfaces and the protrusion defines one or several concave curves such that it is created a gradual transition between the protrusion and the inclined flange to avoid stress concentrations in the cutting head and to achieve an optimised relationship between strength, rigidity and weight. In a plane parallel to the anchoring plane for the cutting insert, the protrusion creates a ramp. The transition between the flange and the protrusion creates as mentioned, a concave surface and the end or finish of the protrusion creates a convex surface such that these together creates an approximately S-like shape seen perpendicularly on the ramp, from the flange and out towards the cutting insert.

It can be provided a hole with a nozzle for providing cutting fluid over the surface defined by the securing surface for the cutting insert or the ramp.

The ramp also has a convex curved transition to the free surface of the flange. The ramp provides a space for the chips created in the cutting process.

This implies that the flange may have two different inclined surfaces turning away from the coupling surface.

In combination this construction results in an optimum relationship between weight, rigidity and strength, with a good distribution of the stresses in the cutting head and a good ability to transfer heat.

In this way it will be possible to design a cutting head according to the invention with a weight that is approximately 50% of the weight for similar cutting heads according to the known art. Accordingly the natural frequency of the cutting head and the adapter increases and gives an increase of the maximum cantilever length. The increase will be in an order of magnitude of about one half to one time the boring bar diameter.

Short description of the drawings.

FIG. 5 shows a cutting head according to the invention secured to an adapter; and FIG. 6 shows a perspective exploded view of a cutting head according to the invention and an adapter.

The invention will now be further described by way of the following example.

Figure 1:
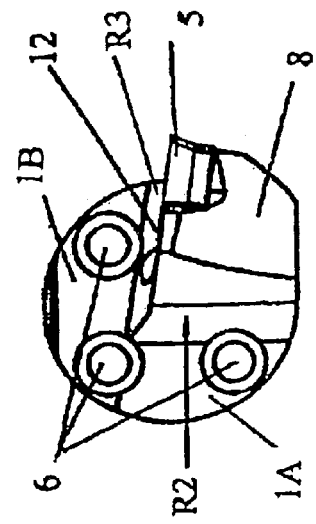
FIG. 1 shows a side elevation of a cutting head according to one embodiment of the invention.

FIG. 1 shows a side elevation of a cutting head with a coupling surface 4 with serrations 11, a protrusion 8 with an upper surface or ramp 12, where the cutting head furthermore comprises a cutting insert 5, and the securing surface for the cutting insert. Furthermore it is shown an, in relation to the coupling surface, inclined free surface 1B going into a concave curve R3 to the ramp 12 on the protrusion 8. The protrusion 8 includes elements for the securing (not shown) the cutting insert 5. Securing cutting inserts is well known in the subject area and will not be further described here.

Figure 2:
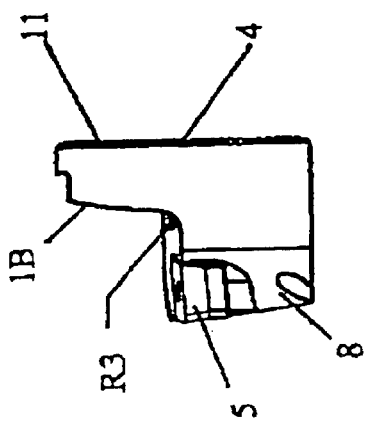
FIG. 2 shows a front elevation of the invention as shown on FIG. 1.

FIG. 2 shows a front elevation of the adapter shown on FIG. 1, where holes for securing the cutting head to the adapter with screws and bolts are shown. The figure also shows two inclined surfaces A1, 1B and the cutting insert 5 on the protrusion 8.

Figure 4:
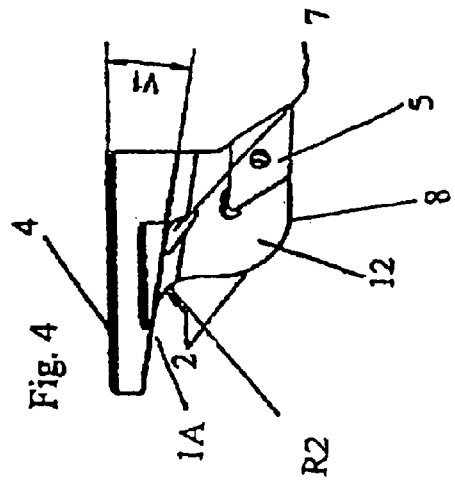
FIG. 4 shows a view seen perpendicular on the cutting head as shown on FIG. 1, 2 and 3.
Figure 3:
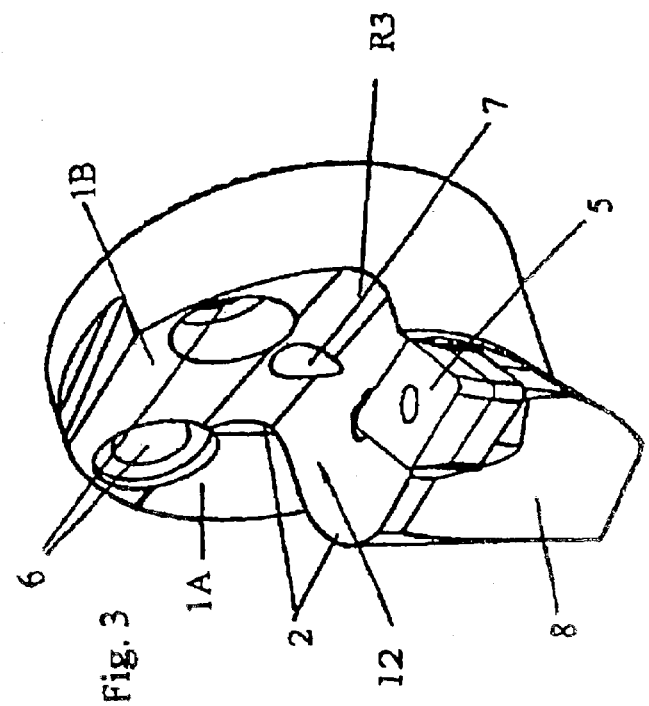
FIG. 3 shows a perspective view of the cutting head shown on FIG. 1 and 2.

FIG. 3 shows that the transition between the flange and the ramp 12 is designed with a radius R3. The figure shows furthermore a cutting insert holder with a cutting insert 5, a hole with a nozzle for bringing forward cutting fluid 7, a transition between the flange and the protrusion 8 comprising an S-shape 2 of a concave surface with a radius R2 and a convex surface, an inclined surface 1A turning away from the coupling surface 4, whose plane creates an angle V1 with the plane of the coupling surface 4 and holes 6 for securing the cutting head to the adapter FIG. 4 shows a view perpendicular on the figure shown on FIG. 1 with serrations 11 in the coupling surface 4 towards the adapter, the inclined surface 1 A, the S-shaped transition 2 with the concave surface with a radius R2 and the convex surface between the inclined surfaces of the flange with an angle V1 and the protrusion 8, the hole for bringing forward cutting fluid 7, the ramp 12 and the cutting insert 5.

FIG. 5 shows the cutting head 13 as defined on FIGS. 1, 2, 3 and 4, secured to a boring bar 9 by means if bolts 10.

FIG. 6 shows the cutting head 13, the bolts 10 and the adapter 9 as shown on FIG. 5 in an exploded view where the serrations 11 on the adapter are clearly shown.

This construction has given a weight reduction of 50% and this has increased the natural frequency of the system in a way such that cantilever length can be increased with a half to one time the diameter of the adapter.

What is claimed is:

1. A cutting head for being secured to an adapter, in a machine tool for chip removing machining, wherein the cutting head comprises a flange with a first side creating a coupling surface adapted for being secured to the adapter, and an on the opposite side of the flange situated, other side creating at least one surface with an outwardly extending protrusion, with securing means adapted for the securing of a cutting insert with at least one cutting edge, wherein the at least one surface defines a plane creating an inclined angle in relation to a plane parallel to the coupling surface, whereby the cross-sectional thickness of the flange increases from a first lateral side to an oppositely situated other lateral side;

wherein a concave surface with a radius between the at least one surface of the flange and the protrusion creates a smooth transition between the flange and the protrusion and the protrusion extends from that part of the flange having the increased thickness; and wherein the protrusion and the flange with the at least one surface with an inclined angle in relation to the plane parallel with the coupling surface, is one integrated piece whereby the weight of the cutting head is reduced as compared to the strength of the cutting head, and the natural frequency of the cutting head is increased when this is secured to the adapter.

2. A cutting head according to claim 1, wherein the protrusion is rounded towards the cutting insert, such that it creates an S-shape between the flange and an end surface of the protrusion whereby a space for good chip departure is created.

3. A cutting head according to claim 1 wherein the other side of the flange comprises two surfaces defining two inclined planes in relation to the plane of the coupling surface.

4. Cutting head according to claim 1, wherein the transition between the two inclined surfaces of the flange and the protrusion defines smooth transitions with defined radiuses to reduce stress concentrations in the cutting head.

5. Cutting head according to claim 1, wherein the cutting head comprises a hole with a nozzle for bringing forward a cutting fluid.

* * * * *